United States Patent
Giebeler

(10) Patent No.: US 9,207,126 B2
(45) Date of Patent: Dec. 8, 2015

(54) INFRARED LIGHT SENSOR CHIP WITH HIGH MEASUREMENT ACCURACY AND METHOD FOR PRODUCING THE INFRARED LIGHT SENSOR CHIP

(71) Applicant: Pyreos Ltd., Edinburgh (GB)

(72) Inventor: Carsten Giebeler, Edinburgh (GB)

(73) Assignee: Pyreos Ltd., Edinburgh (GB)

(*) Notice: Subject to any disclaimer, the term of this patent is extended or adjusted under 35 U.S.C. 154(b) by 0 days.

(21) Appl. No.: 14/309,204

(22) Filed: Jun. 19, 2014

(65) Prior Publication Data
US 2014/0299770 A1    Oct. 9, 2014

Related U.S. Application Data

(63) Continuation of application No. PCT/EP2012/075928, filed on Dec. 18, 2012.

(30) Foreign Application Priority Data

Dec. 19, 2011  (DE) .......... 10 2011 056 610

(51) Int. Cl.
| | | |
|---|---|---|
| *G01J 5/02* | (2006.01) | |
| *G01J 5/34* | (2006.01) | |
| *G01J 5/10* | (2006.01) | |
| *G01J 5/06* | (2006.01) | |

(52) U.S. Cl.
CPC .... *G01J 5/02* (2013.01); *G01J 5/10* (2013.01); *G01J 5/34* (2013.01); *G01J 2005/068* (2013.01)

(58) Field of Classification Search
CPC ............... G01J 5/02; G01J 5/10; G01J 5/34; G01J 2005/068
See application file for complete search history.

(56) References Cited

U.S. PATENT DOCUMENTS

| | | | | |
|---|---|---|---|---|
| 4,724,356 A | * | 2/1988 | Daehler | 313/522 |
| 2008/0093553 A1 | * | 4/2008 | Lian et al. | 250/338.3 |

(Continued)

FOREIGN PATENT DOCUMENTS

| | | |
|---|---|---|
| DE | 19525071 A1 | 1/1997 |
| DE | 19710358 A1 | 9/1998 |

(Continued)

OTHER PUBLICATIONS

International Preliminary Report on Patentability, Written Opinion, and International Search Report dated Mar. 21, 2013 in counterpart International Application No. PCT/EP2012/075928, along with an English language translation dated Jul. 3, 2014.

(Continued)

*Primary Examiner* — Marcus Taningco
*Assistant Examiner* — Mindy Vu
(74) *Attorney, Agent, or Firm* — Edell, Shapiro & Finnan, LLC

(57) ABSTRACT

An infrared light sensor chip comprises a substrate (2), an infrared light sensor (9), which has a base electrode (10) that is in direct contact with one side (8) of the substrate (2) and which is used to attach the infrared light sensor (9) to the substrate (2), and a resistance thermometer (13), which has a resistance path (14) in direct contact with the side (8) of the substrate (2) adjacent to the infrared light sensor (9) and configured to measure the temperature of the substrate (2) via the resistance thermometer (13). The resistance path (14) is made of the same material of which the base electrode (10) is made.

15 Claims, 1 Drawing Sheet

A—A

(56) References Cited

U.S. PATENT DOCUMENTS

| | | | |
|---|---|---|---|
| 2011/0049369 A1 | 3/2011 | Giebeler et al. | |
| 2011/0103424 A1* | 5/2011 | Imholt | 374/45 |

FOREIGN PATENT DOCUMENTS

| | | |
|---|---|---|
| DE | 102009027733 A1 | 1/2011 |
| DE | 102009037111 B4 | 7/2011 |
| DE | 102007046451 B4 | 8/2011 |
| JP | H1164111 A | 3/1999 |
| JP | 2000121431 A | 4/2000 |
| JP | 2000356546 A | 12/2000 |
| JP | 2003257707 A | 9/2003 |
| JP | 2009058463 A | 3/2009 |

OTHER PUBLICATIONS

Office Action in corresponding German Application No. 102011056610.4, dated Dec. 12, 2012, with a partial English language translation.

Office Action in corresponding Japanese Application No. 2014-547918, dated Nov. 17, 2014, along with an English translation.

* cited by examiner

A—A

INFRARED LIGHT SENSOR CHIP WITH HIGH MEASUREMENT ACCURACY AND METHOD FOR PRODUCING THE INFRARED LIGHT SENSOR CHIP

CROSS-REFERENCE TO RELATED APPLICATIONS

This is a Continuation of International Application PCT/EP2012/075928, with an international filing date of Dec. 18, 2012, which was published under PCT Article 21(2) in German, and the complete disclosure of which is incorporated into this application by reference.

FIELD OF AND BACKGROUND OF THE INVENTION

The invention relates to an infrared light sensor chip with high measurement accuracy and a method for producing the infrared light sensor chip.

In order to detect gas, it is known to use infrared light that is in a wavelength range of 3 to 5 μm. The gas to be detected is irradiated with a light source that is suitable for emitting infrared light in this wavelength range. In this case a portion of the infrared light is absorbed by the gas, so that a residual light remains. The residual light can be measured with an infrared light sensor, with which the wavelength range and/or the intensity of the residual light can be detected and can be converted accordingly into an electrical signal. On the basis of the electrical signal, a suitable analysis allows the user to draw a conclusion regarding the type and the content of the detected gas.

The infrared light detector chip has typically a layer with pyroelectrically sensitive material, which is, for example, lead zirconate titanate (PZT). The layer is usually applied to a support membrane, which is normally made of silicon. Furthermore, the layer is electronically connected to electrodes, which are made, for example, of platinum or a nickel-chromium alloy that absorbs the infrared light radiation.

The infrared light sensor chip is used, for example, in a non-dispersive infrared light absorption analyzer (NDIR), which can be used for measuring gas concentrations. The output signal of the infrared light sensor chip that is based on a measurement of a gas concentration is highly dependent on the temperature, which the infrared light sensor chip has during the measurement, so that the measurement accuracy of the non-dispersive infrared absorption analyzer depends on the exact knowledge of the temperature of the infrared light sensor chip.

The infrared light sensor chip has a housing, in which the support membrane with the pyroelectrically sensitive layer and the electrodes is encapsulated for protection against harmful environmental effects. In order to draw a conclusion regarding the temperature of the infrared light sensor chip during the measurement, the non-dispersive infrared absorption analyzer is additionally provided with a temperature sensor, with which the temperature of the surrounding area of the infrared light sensor chip is currently measurable. Because the housing of the infrared light sensor chip is designed as small as possible for space-related reasons, the temperature sensor is arranged outside the housing. If the temperature sensor is attached to the housing, then the temperature of the housing is measured with the temperature sensor. As an alternative, the temperature sensor is arranged in close proximity to the housing, so that the ambient temperature of the housing is measured with the temperature sensor. In particular, if the ambient temperature changes with time, the situation generally arises that the temperature measured by the temperature sensor does not correlate with the temperature of the pyroelectrically sensitive layer, so that the results are measuring inaccuracies for the infrared light sensor chip.

OBJECTS AND SUMMARY OF THE INVENTION

An object of the present invention is to provide an infrared light sensor chip and a method of producing the infrared light sensor chip in such a way that the infrared light sensor chip has a high measurement accuracy.

This object is achieved by f the features of the independent patent claims. Preferred embodiments of said features are disclosed in the additional patent claims.

The infrared light sensor chip according to the invention comprises a substrate, an infrared light sensor, which has a base electrode that is in direct contact with one side of the substrate and by means of which the infrared light sensor is attached to the substrate, and a resistance thermometer, which has a resistance path, which is in direct contact with the side of the substrate adjacent to the infrared light sensor and is configured to measure the temperature of the substrate by means of the resistance thermometer, wherein the resistance path is made of the material of the base electrode. The inventive method for producing the infrared light sensor chip comprises the steps: providing the substrate; coating the substrate on the side with the base electrode material, so that the side is covered by a layer of the base electrode material; removing the excess material of the base electrode layer, so that the base electrode and the resistance path are formed on the side of the substrate; completing the infrared light sensor.

The infrared light sensor chip is typically encapsulated in a housing, in order to protect the infrared light sensor chip from potentially harmful environmental effects. It is desirable to design the housing as small as possible, so that the space requirement of the infrared light sensor chip is low. Since a conventional temperature sensor for a conventional infrared light sensor chip does not fit into the housing, the conventional temperature sensor is arranged outside the housing. In contrast, the infrared light sensor chip according to the invention comprises the resistance thermometer that is mounted with its resistance path directly on the surface of the substrate adjacent to the infrared light sensor, so that the resistance thermometer is arranged inside a housing, which is provided for the infrared light sensor chip and which can be made advantageously small. In addition, the temperature of the substrate is directly detectable with the resistance thermometer, as a result of which the temperature of the infrared light sensor can be accurately measured. The exact knowledge of the current temperature of the infrared light sensor enables an accurate calibration of measurements with the infrared light sensor, so that an accurate calibration of the infrared light sensor is made possible with the use of the resistance thermometer, as a result of which the infrared light sensor chip has a high measurement accuracy.

Since the resistance path is made from the material of the base electrode, there is the advantage that only a single production step is necessary for the production of the resistance path of the resistance thermometer and the base electrode. The net result is that a simple and cost effective production of the infrared light sensor chip is achieved. Furthermore, in this production step for the resistance path and the base electrode, the resistance path can be placed directly adjacent to and at a short distance from the base electrode, so that, on the one hand, the space requirement of the infrared light sensor chip is advantageously low and, on the other hand, the temperature that can be measured by the resistance path correlates well with the current temperature of the infrared light sensor.

Preferably the material of the base electrode is platinum. The resistance path and the base electrode have preferably the same thickness. In this case the thickness of the resistance path and the base electrode has to be taken perpendicular to the upper surface of the side of the substrate, on which both the resistance path and the base electrode are mounted. Furthermore, the resistance path is configured preferably in a meandering shape. Under the normal boundary conditions for the infrared light sensor chip the width of the base electrode is usually too small for the required length of the resistance path, especially if the material of the base electrode and the resistance path is platinum, and the base electrode and the resistance path are supposed to have the same thickness. Because the resistance path is designed preferably in a meandering shape, the length of the resistance path has to be chosen to match, without generating at the same time a space requirement that exceeds the width of the base electrode.

The resistance thermometer has a resistance electrode at each of the longitudinal ends of the resistance path, in order to electronically tap off the current electrical resistance of the resistance path. The resistance thermometer can be operated by means of the resistance electrodes, for example, with a Wheatstone measuring bridge.

Furthermore, it is preferred that the substrate comprises a frame and a membrane that is defined by the frame, wherein the infrared light sensor is disposed with its base electrode on the membrane; and the resistance thermometer is disposed with its resistance path on the frame. In this case the frame is configured preferably wider at the location, at which the resistance thermometer is disposed, than at the other locations. The result is that the resistance thermometer is advantageously disposed on the frame of the substrate that is already provided for the purpose of holding the membrane. This feature eliminates the need to provide additional support for the resistance thermometer, as a result of which the infrared light sensor chip has a compact design. Preferably only the frame is designed wider on the side, on which the resistance thermometer is disposed, than at the other locations, so that sufficient space is provided for the preferably meandering course of the resistance path.

The infrared light sensor comprises preferably a sensor element, which is disposed on the base electrode and is connected electrically conductive to said base electrode. The material of the sensor element is preferably lead zirconate titanate. In addition, it is preferred that the infrared light sensor chip is produced with a thin film process. The resistance path has preferably a thickness of 40 to 100 nm and/or a width of 5 to 10 μm and/or an electrical resistance of 1 k$\chi$ at room temperature.

During the production of the infrared light sensor chip the material of the base electrode is preferably vapor deposited on the substrate for the purpose of coating the substrate. In order to produce the sensor element, it is preferred that the base electrode layer is coated with the material of the sensor element. At the same time it is preferred that in order to coat the base electrode layer, the sensor element material is applied to the base electrode layer with a sputtering process.

One advantage gained with the infrared light sensor chip according to the invention is that the temperature can be measured directly at the sensor element, as a result of which the calibration and, therefore, the measuring accuracy of the infrared light sensor chip is high. In a conventional sensor chip a temperature sensor is arranged, for example, outside a housing, as a result of which the temperature sensor is designed as a discrete component. Due to the fact that in the infrared light sensor chip according to the invention, the resistance thermometer is disposed with its resistance path directly on the substrate, the resistance thermometer is designed as a component that is integrated in the infrared light sensor chip. The result is that there is no need to provide the infrared light sensor chip according to the invention with, for example, an additional component for a temperature sensor, as is the case with the conventional infrared light sensor chip, so that both the production effort and, hence, the production costs as well as the overall size of the infrared light sensor chip of the invention are low compared to the conventional infrared light sensor chip.

In the conventional infrared light sensor chip the discrete temperature sensor is often mounted on the underside of a printed circuit board. At the same time this temperature sensor is usually the single unique component on the underside. Therefore, during the assembly process, for example in a reflow oven, it is necessary that the temperature sensor be thermally protected. The measures that are necessary for such protection are complex and associated with additional production costs. It is advantageous that such measures are not necessary during the production of the infrared light sensor chip of the invention. Furthermore, the integration process of the resistance thermometer is compatible with the process for producing the pyroelectric infrared light sensor and can, therefore, be carried out directly at the wafer level, so that the net result is a cost advantage for the inventive method for producing the infrared light sensor chip.

BRIEF DESCRIPTION OF THE DRAWINGS

A preferred exemplary embodiment of an infrared light sensor chip according to the invention is explained below with reference to the accompanying schematic drawings. The drawings show in.

DETAILED DESCRIPTION OF PREFERRED EMBODIMENTS

Figure 1:
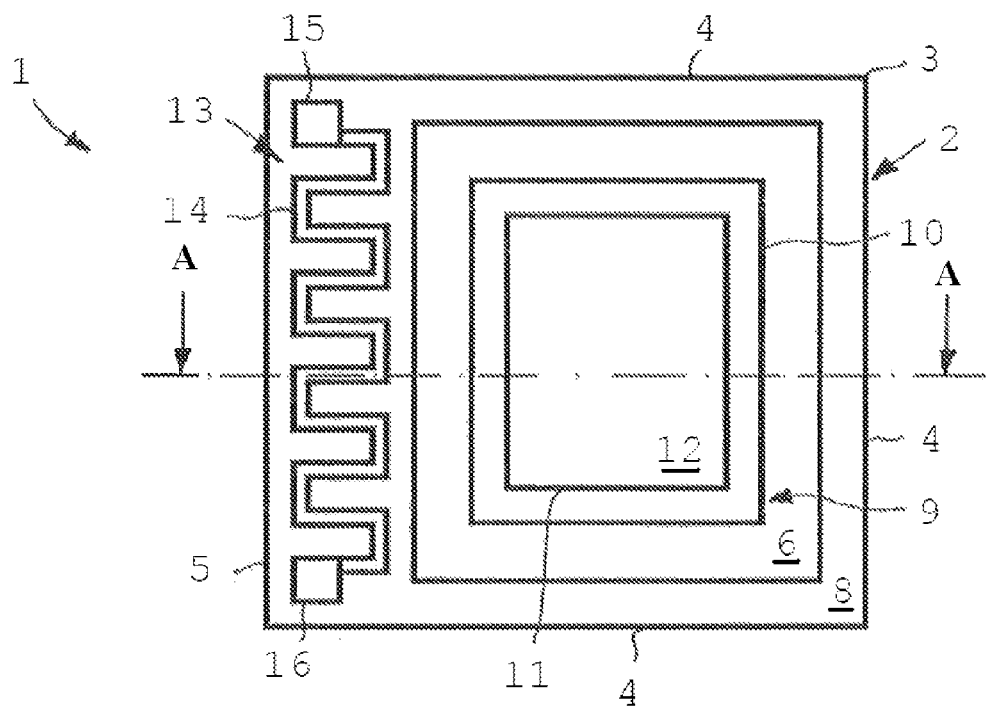
FIG. 1 a plan view of a schematic representation of the infrared light sensor chip according to the invention.
Figure 2:
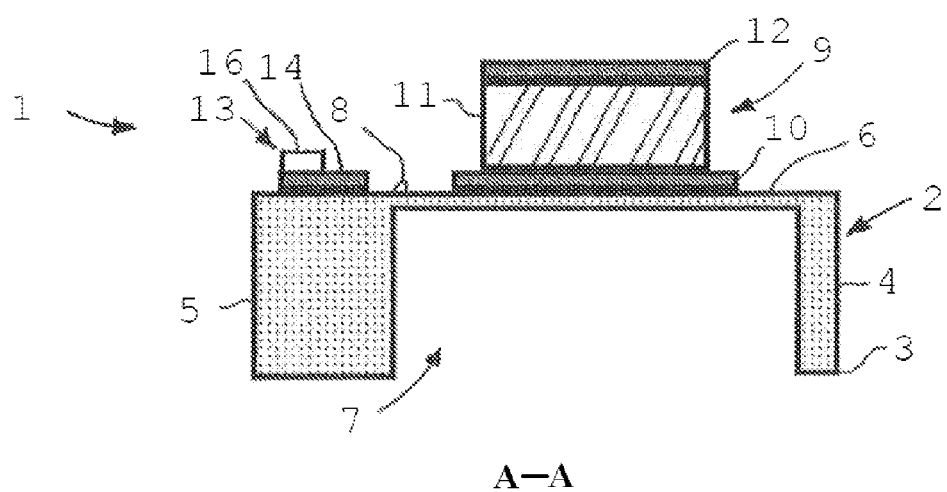
FIG. 2 a representation of the section A-A from FIG. 1.

As can be seen from FIGS. 1 and 2, an infrared light sensor chip 1 comprises a substrate 2, which is formed by a frame 3. The frame 3 has a rectangular planform shape, where one side of the frame 3 is formed by a narrow frame section 4, and the other three sides of the frame 3 are formed by wide frame sections 5. The frame 3 defines a membrane 6, which is disposed on the upper side 8 of the frame 3. The frame 3 is made preferably of silicon, and the membrane 6 is made preferably of silicon oxide and/or silicon nitride. In this case a membrane recess 7 is removed from a silicon wafer having a coating of silicon oxide and/or silicon nitride in such a way that the frame 3 is formed with the membrane 6.

The frame 3 and the membrane 6 form a planar surface on the upper surface 8 of the substrate. In this case an infrared light sensor 9 is disposed in the middle of the membrane 6. The infrared light sensor 9 and the membrane 6 are dimensioned in their plan views in such a way that the infrared light sensor 9 is arranged inside the frame 3 in the plan view and, as a result, is completely surrounded by the membrane 6.

The infrared light sensor 9 comprises a base electrode 10 that is mounted directly on the upper side 8 of the substrate. Mounted on the base electrode 10 is a sensor element 11, which is made of lead zirconate titanate. In the plan view the sensor element 11 is dimensioned slightly smaller than the base electrode 10, so that the base electrode 10 protrudes slightly from the sensor element 11 on the upper side 8 of the substrate. A head electrode 12, which is congruent with the sensor element 11 in the plan view, is disposed on the sensor element 11. The sensor element 11 is connected electrically conductive to both the base electrode 10 and the head electrode 12, so that charge transfers generated by an infrared light irradiation of the infrared light sensor 9 can be tapped.

On the upper side 8 of the substrate a resistance thermometer 13 is mounted in an integrated manner on the wide section 5 of the edge. The resistance thermometer 13 comprises a resistance path 14, which extends in a meandering pattern along the wide section 5 of the frame and parallel to the facing side of the base electrode 10. A resistance electrode 15, 16 is mounted on each of the longitudinal ends of the resistance path 14.

The base electrode 10 and the resistance path 14 are made of platinum and have the same thickness. The length of the resistance path 14 is dimensioned in such a way that the resistance thermometer 13 has an electrical resistance of 1 k$\chi$. The thickness of the resistance path 14 is between 400 and 100 nm, and its width is between 5 to 10 μm. The resistance path 14 is arranged directly adjacent to and at a short distance from the base electrode 10, on which the sensor element 11 is disposed. The heat path from the sensor element 11 to the resistance path 14 extends from the sensor element 11 by way of the base electrode 10, the membrane 6 and the wide section 5 of the frame to the resistance path 14. The heat conducting path is formed so short that the temperature of the resistance path 14 during normal operation of the infrared light sensor chip is only negligibly different from the temperature of the sensor element 11. If the electrical resistance of the resistance path 14 is measured, for example, by applying a Wheatstone measuring bridge to the resistance electrodes 15, 16, then it in turn allows the user to draw an accurate conclusion regarding the current temperature of the sensor element 11.

During normal operation of the infrared light sensor chip it is important for calibration purposes to know as precisely as possible the current temperature of the sensor element 11. Due to the fact that the current temperature of the sensor element 11 can be determined very accurately with the resistance thermometer 13, which is provided, according to the invention, on the substrate 2, the measurement accuracy of the infrared light sensor chip 1 is high.

In order to produce the infrared light sensor chip, it is necessary to provide the substrate 2, which comprises the frame 3 and the membrane 6. The membrane 6 and the frame 3 are formed flush with the upper side 8 of the substrate. In order to produce the base electrode 10 and the resistance path 14, the substrate 2 has to be coated with platinum on the upper side 8 of the substrate, so that the upper side 8 of the substrate is covered with the platinum, as a result of which a layer of platinum is formed on the upper side 8 of the substrate. The platinum layer is produced on the upper side 8 with a vapor deposition process.

A layer of lead zirconate titanate is to be applied to the platinum layer with a sputtering process, and on this layer in turn an additional layer of platinum is to be applied in order to form the head electrode 12. The excess material on the substrate 2 is removed by etching, so that the resistance path 14 and the base electrode 10 are formed by the first platinum layer, which is disposed directly on the substrate 2. Thus, the resistance path 14 and the base electrode 10 are produced during the vapor deposition of the first platinum layer and during removal of the excess material in one process step, as a result of which the method for producing the infrared light sensor chip 1 is simple and cost effective. Furthermore, the sensor element 11 is formed from the layer of lead zirconate titanate, and the head electrode 12 is formed from the second platinum layer that is disposed on the layer of lead zirconate titanate.

LIST OF REFERENCE NUMERALS 1 infrared light sensor chip
2 substrate
3 frame
4 narrow frame section
5 wide frame section
6 membrane
7 membrane recess
8 upper side of the substrate
9 infrared light sensor
10 base electrode
11 sensor element
12 head electrode
13 resistance thermometer
14 resistance path
15 first resistance electrode
16 second resistance electrode

The invention claimed is:

1. Infrared light sensor chip comprising:
    a substrate;
    an infrared light sensor, which has a base electrode in direct contact with one side of the substrate and via which the infrared light sensor is attached to the substrate; and
    a resistance thermometer, which has a resistance path that is in direct contact with the side of the substrate adjacent to the infrared light sensor and that is arranged to measure the temperature of the substrate via the resistance thermometer;
    wherein the resistance path and the base electrode are composed of a same material.

2. Infrared light sensor chip, as claimed in claim 1, wherein the material of the base electrode is platinum.

3. Infrared light sensor chip, as claimed in claim 1, wherein the resistance path and the base electrode are equally thick.

4. Infrared light sensor chip, as claimed in claim 1, wherein the resistance path is configured in a meandering shape.

5. Infrared light sensor chip, as claimed in claim 1, wherein the resistance thermometer has a respective resistance electrode at each longitudinal end of the resistance path, for electronically tapping off a current electrical resistance of the resistance path.

6. Infrared light sensor chip, as claimed in claim 1, wherein the substrate comprises a frame and a membrane that is defined by the frame, wherein the infrared light sensor is disposed with its base electrode on the membrane, and the resistance thermometer is disposed with its resistance path on the frame.

7. Infrared light sensor chip, as claimed in claim 6, wherein the frame is configured wider at a first location, at which the resistance thermometer is disposed, than at locations of the frame other than the first location.

8. Infrared light sensor chip, as claimed in claim 1, wherein the infrared light sensor comprises a sensor element disposed on the base electrode and electrically conductively connected to the base electrode.

9. Infrared light sensor chip, as claimed in claim 8, wherein the sensor element consists essentially of lead zirconate titanate.

10. Infrared light sensor chip, as claimed in claim 1, wherein the infrared light sensor chip a thin film light sensor chip.

11. Infrared light sensor chip, as claimed in claim 1, wherein the resistance path has at least one of:
   a thickness of 40 to 100 nm, a width of 5 to 10 μm, and an electrical resistance of 1 kχ at room temperature.

12. Method for producing an infrared light sensor chip, as claimed in claim 1, said method comprising:
   providing the substrate;
   coating the substrate on the side with the base electrode material, so that the side is covered by a layer of the base electrode material;
   removing excess material of the base electrode material layer, so that the base electrode and the resistance path are formed on the side of the substrate; and
   completing production of the infrared light sensor.

13. Method, as claimed in claim 12, further comprising: coating the substrate by vapor depositing the base electrode material on the substrate.

14. Method, as claimed in claim 12, further comprising:
   coating the base electrode layer with the sensor element material.

15. Method, as claimed in claim 14, further comprising: coating the base electrode layer by applying, the sensor element material to the base electrode layer with a sputtering process.

* * * * *